(12) United States Patent
Tang

(10) Patent No.: US 9,203,630 B2
(45) Date of Patent: Dec. 1, 2015

(54) METHOD AND APPARATUS FOR SEAMLESSLY IMPLEMENTING TRANSFERRING DUAL-PARTY CALL INTO CONFERENCE

(71) Applicant: Huawei Technologies Co., Ltd., Shenzhen (CN)

(72) Inventor: Longhai Tang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 350 days.

(21) Appl. No.: 13/785,532

(22) Filed: Mar. 5, 2013

(65) Prior Publication Data

US 2013/0182617 A1   Jul. 18, 2013

Related U.S. Application Data

(63) Continuation of application No. PCT/CN2012/076744, filed on Jun. 12, 2012.

(30) Foreign Application Priority Data

Dec. 16, 2011 (CN) .......................... 2011 1 0424270

(51) Int. Cl.
*H04L 12/18* (2006.01)
*H04M 3/56* (2006.01)
(Continued)

(52) U.S. Cl.
CPC ............ *H04L 12/18* (2013.01); *H04L 65/1093* (2013.01); *H04L 65/4038* (2013.01); *H04M 3/56* (2013.01); *H04M 3/58* (2013.01)

(58) Field of Classification Search
CPC ...................................... H04M 3/567
See application file for complete search history.

(56) References Cited

U.S. PATENT DOCUMENTS

2009/0080633 A1 * 3/2009 Shi ..................... H04L 12/1818
379/202.01
2010/0198954 A1   8/2010 Grasso et al.
(Continued)

FOREIGN PATENT DOCUMENTS

CN    101771767 A    7/2010
CN    102307269 A    1/2012
(Continued)

OTHER PUBLICATIONS

International Search Report and Written Opinion of the International Search Authority issued in corresponding PCT Application No. PCT/CN2012/076744; mailed Oct. 18, 2012.
(Continued)

*Primary Examiner* — Andrew Lai
*Assistant Examiner* — Zhiren Qin
(74) *Attorney, Agent, or Firm* — Brinks Gilson & Lione

(57) ABSTRACT

A method for seamlessly transferring a dual-party call into a conference includes receiving a conference room creation request from a first terminal, and creating a conference room according to the conference room creation request. The method also includes establishing and starting a first voice channel between the first terminal and the conference room, a second voice channel between the second terminal and the conference room, and a third voice channel between a third terminal and the conference room while maintaining a dual-party voice channel between the first terminal and a second terminal in an on state. After starting the first voice channel and the second voice channel, the method includes simultaneously releasing the dual-party voice channel.

9 Claims, 4 Drawing Sheets

(51) Int. Cl.
*H04L 29/06* (2006.01)
*H04M 3/58* (2006.01)

(56) References Cited

U.S. PATENT DOCUMENTS

2011/0032923 A1* 2/2011 Ho .................. H04W 88/14
370/342
2013/0024196 A1* 1/2013 Ganong, III ............ G10L 17/00
704/246

FOREIGN PATENT DOCUMENTS

CN 102316228 A 1/2012
WO 2009/003496 A1 1/2009

OTHER PUBLICATIONS

Office Action issued in corresponding Chinese Patent Application No. 201110424270.1, mailed Mar. 7, 2013.

* cited by examiner

METHOD AND APPARATUS FOR SEAMLESSLY IMPLEMENTING TRANSFERRING DUAL-PARTY CALL INTO CONFERENCE

CROSS REFERENCE

This application is a continuation of International Application No. PCT/CN2012/076744, filed on Jun. 12, 2012, which claims priority to Chinese Patent Application No. 201110424270.1, filed on Dec. 16, 2011, both of which are hereby incorporated by reference in their entireties.

FIELD OF THE APPLICATION

The present application relates to the field of communication technologies, and in particular, to a method and apparatus for seamlessly implementing transfer of a dual-party call into a conference.

BACKGROUND

With the rapid development of the Voice Over IP, VOIP, service, application occasions for services such as calls across the Circuit Switched, CS, Domain and the Packet Switched, PS, Domain as well as Peer-to-Peer, P2P, calls etc. also become more and more.

Business scenarios, where it is needed to transfer a dual-party conversation into a multi-party conference, usually occur in the process of people being in a VOIP conversation. There are several existing implementation modes as follows: one mode is to implement one local conference room for a multi-party conversation at a client, thus implementing a business scenario where a dual-party conversation is transferred into a multi-party conversation. Another mode is to release an existing dual-party call, create one new conference room, and pull related conference participants into the conference room, so as to manually implement transferring both types of calls into a conference.

However, for the first mode, under the scenario where sounds are mixed locally at the terminal, each time an anchor-person adds a conversation of one party, one path of local bandwidth will be added, which has higher requirements on the network locally at the terminal; and in addition, each time one path of terminal is added, one path of sound mixing codec processing is needed, which requires the terminal to have higher software processing capacity for a VOIP application with higher requirements on the immediacy, thus limiting the occasions for which the implementation mode for mixing sounds at the terminal is suitable. The last of the above modes needs to cut off the current conversation and re-create a mode of inviting the opposite party and a third party to participate in the conference, which results in interruption of the current conversation and brings extreme inconvenience to the user.

SUMMARY

The embodiments of present application provides a method and apparatus for seamlessly implementing transfer of a dual-party call into a conference, for avoiding defects of excessively adding the burden of the terminal or interrupting the current session when a third party is needed to participate in a dual-party conversation.

One aspect of the present application provides a method for seamlessly implementing transfer of a dual-party call into a conference, comprising:

receiving a conference room creating request transmitted by a first terminal;

creating a conference room according to the conference room creating request; and while holding a dual-party voice channel between the first terminal and the second terminal in an on state, establishing and starting a first voice channel between the first terminal and the conference room, a second voice channel between the second terminal and the conference room and a third voice channel between the third terminal and the conference room, and after starting the first voice channel and the second voice channel at the same time, releasing the dual-party voice channel.

In the method for seamlessly implementing transfer of a dual-party call into a conference as described above, preferably, after receiving the conference room creating request transmitted by the first terminal and before creating the conference room according to the conference room creating request, the method further comprises:

performing authentication on the first terminal according to an identification of the first terminal in the conference room creating request, and when the authentication passes, triggering performance of an operation of creating the conference room according to the conference room creating request.

In the method for seamlessly implementing transfer of a dual-party call into a conference as described above, preferably, performing authentication on the first terminal according to an identification of the first terminal in the conference room creating request comprises:

when the first terminal is a cell phone, performing authentication on the first terminal according to a cell phone number of the first terminal in the conference room creating request; and when the first terminal is a personal computer, performing authentication on the first terminal according to an IP address of the first terminal in the conference room creating request.

In the method for seamlessly implementing transfer of a dual-party call into a conference as described above, preferably, establishing a first voice channel between the first terminal and the conference room comprises:

transmitting response information that the conference room is created successfully to the first terminal, wherein, the response information comprises a conference room identifier of the conference room; and receiving reply information returned by the first terminal according to the response information, and establishing the first voice channel between the first terminal and the conference room according to the reply information.

In the method for seamlessly implementing transfer of a dual-party call into a conference as described above, preferably, establishing and starting a first voice channel between the first terminal and the conference room, a second voice channel between the second terminal and the conference room and a third voice channel between the third terminal and the conference room comprises:

establishing the first voice channel between the first terminal and the conference room, and establishing the third voice channel between the third terminal and the conference room and holding the third voice channel in an off state; and after releasing the dual-party voice channel, starting the third voice channel.

In the method for seamlessly implementing transfer of a dual-party call into a conference as described above, preferably, after releasing the dual-party voice channel, the method further comprises:

transmitting a releasing command to the first terminal, to indicate the first terminal to release a call leg between the first terminal and the second terminal according to the releasing command.

Another aspect of the present application provides an apparatus for seamlessly implementing transfer of a dual-party call into a conference, comprising:

a request receiving module for receiving a conference room creating request transmitted by a first terminal;

a conference room creating module for creating a conference room according to the conference room creating request; and a channel establishing module for establishing and starting a first voice channel, a third voice channel and a second voice channel between the first terminal, a third terminal as well as a second terminal and the conference room respectively while holding a dual-party voice channel between the first terminal and the second terminal in an on state; and a channel releasing module for releasing the dual-party voice channel after starting the first voice channel and the second voice channel at the same time.

In the apparatus for seamlessly implementing transfer of a dual-party call into a conference as described above, preferably, the apparatus further comprises:

an identity authentication module for performing authentication on the first terminal according to an identification of the first terminal in the conference room creating request, and when the authentication passes, triggering performance of an operation of creating the conference room according to the conference room creating request. In the apparatus for seamlessly implementing transfer of a dual-party call into a conference as described above, preferably, the channel establishing module comprises:

a first establishing unit, a second establishing unit and a third establishing unit for establishing and starting a first voice channel, a second voice channel and a third voice channel between the first terminal, the second terminal as well as the third terminal and the conference room respectively, wherein, the first establishing unit comprises:

an information notification sub-unit for transmitting response information that the conference room is created successfully to the first terminal, wherein, the response information comprises a conference room identifier of the conference room; and a channel establishing sub-unit for receiving reply information returned by the first terminal according to the response information, and establishing the first voice channel between the first terminal and the conference room according to the reply information.

In the apparatus for seamlessly implementing transfer of a dual-party call into a conference as described above, preferably, the channel establishing module further comprises:

a closing holding unit for holding the third voice channel in an off state; and a channel starting unit for starting the third voice channel after releasing the dual-party voice channel.

In the apparatus for seamlessly implementing transfer of a dual-party call into a conference as described above, preferably, the apparatus further comprises:

a command transmitting module for transmitting a releasing command to the first terminal, to indicate the first terminal to release a call leg between the first terminal and the second terminal according to the releasing command.

According to the method and apparatus for seamlessly implementing transfer of a dual-party call into a conference of the present application, a dual-party call can be transferred into a three-party conference in the condition of avoiding interrupting the current conversation.

BRIEF DESCRIPTION OF THE DRAWINGS

In order to more clearly illustrate the embodiments of the present application or the technical solutions in the prior art, the accompanying drawings needed to be used in the embodiments or the description of the prior art will be simply introduced hereinafter. Obviously, the accompanying drawings in the following description are merely some embodiments, and for a person ordinary in the art, other accompanying drawings can also be obtained according to these accompanying drawings without contributing any creative working.

DETAILED DESCRIPTION

In order to make the purpose, technical solution and advantages of the embodiments more clear, the technical solution in the embodiments will be clearly and completely described in conjunction with the accompanying drawings in the embodiments hereinafter. Obviously, the described embodiments are a part of the embodiments instead of all the embodiments. Based on the embodiments, all other embodiments obtained in the premise that no creative working is made by a person ordinary in the art belong to the scope protected by the present invention. It should be illustrated that all the accompanying drawings use a very simple form and use an inaccurate ratio, which are merely used to conveniently and clearly aid in illustrating the purpose of the embodiments.

Embodiment One

The embodiments provide a method for seamlessly implementing transfer of a dual-party call into a conference. The method for seamlessly implementing transfer of a dual-party call into a conference is suitable for a Session Initiation Protocol, SIP, based conference system. The SIP is a control protocol of an application layer, and is used to initiate a session. The SIP can control the establishment and termination of a multimedia session in which multiple participants participate, and can dynamically adjust and modify attributes of the session. When it is needed to transfer into a three-party or even multi-party conference during a dual-party call, the SIP based conference system can be used to implement the seamless transfer, i.e., establishing one conference room through the conference system, seamlessly switching the dual parties during the conversation into the conference room, and making the third party participate in the conference room. The conference system comprises a Conference Application Service, Conference AS for short, and a Contrex Application Service, Contrex AS for short, wherein, the Conference AS is used to create a conference room according to a conference room creating request, various terminals participating in the conference transmits their own media streams to the Contrex AS, and the Contrex AS is responsible for forwarding the mixed sounds and the media streams. The various terminals can not only initiate a session, but also can accept and respond to the session.

Figure 1:
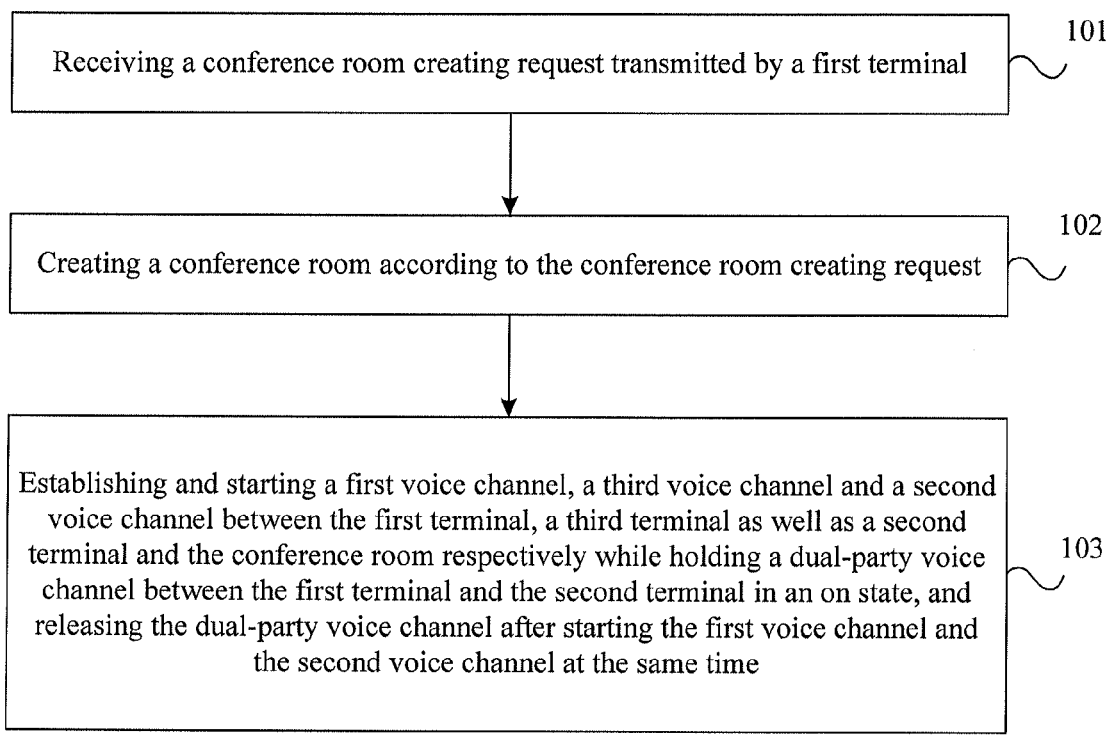
FIG. 1 is a flowchart diagram of a method for seamlessly implementing transfer of a dual-party call into a conference according to one embodiment.

As shown in FIG. 1, a flowchart diagram of a method for seamlessly implementing transfer of a dual-party call into a conference provided by the present embodiment is illustrated.

Step 101, receiving a conference room creating request transmitted by a first terminal.

The conference room in step 101 refers to a conference room control unit, and can be created in a conference system. The conference room control unit can extract information and signaling such as audios, videos, data etc. from information streams of various terminals after being synchronously separated, then transmit the information and signaling of various field points of the conference to the same processing module to complete processes such as corresponding audio mixing or switching, video mixing or switching, data broadcast and route selecting, as well as timing and conference control etc., and finally recombine various information needed by various terminals and transmit the combined information to corresponding system devices of the various terminals. The first terminal can be any party of the dual parties during the conversation, i.e., either a calling party or a called party. In the following, the other party who is conversing with the first terminal is a second terminal. The conference room creating request is a request for requesting the Conference AS to establish a conference room for the first terminal.

Step 102, creating a conference room according to the conference room creating request.

After receiving the conference room creating request, the corresponding conference room is created according to information in the conference room creating request, i.e., establishing a corresponding conference room control unit.

Step 103, establishing and starting a first voice channel, a third voice channel and a second voice channel between the first terminal, a third terminal as well as the second terminal and the conference room respectively while holding a dual-party voice channel between the first terminal and the second terminal in an on state, and releasing the dual-party voice channel after starting the first voice channel and the second voice channel at the same time.

The first voice channel to the conference room is a voice channel established between the first terminal and the conference room control unit, and voice information is received from the first terminal or the voice information is transmitted to the first terminal through the voice channel, and the same is true for the second voice channel and the third voice channel. While the dual-party voice channel between the first terminal and the second terminal is a direct voice channel between the first terminal and the second terminal, and dual parties can receive information of the other party through the voice channel directly without transfer. The opening of the voice channel means what a user said through a terminal connected to the conference room can be heard by other terminals, and the terminal can also hear what other users said through other terminals connected to the conference room. While the closing of the channel means other terminals of the conference room cannot hear what a terminal user said for which the voice channel is closed, and meanwhile, what the terminal user said also cannot be heard by other terminals. Starting the first voice channel and the second voice channel at the same time can ensure that voice communication between the first terminal and the second terminal will not be interrupted.

In addition, an order of establishing the first voice channel, the second voice channel and the third voice channel is not limited, and can be random, while an order of starting the first voice channel, the second voice channel and the third voice channel is also not limited and can also be random.

It should be particularly pointed out that at this time, the voice communication between the first terminal and the second terminal is not stopped, i.e., the first terminal and the second terminal are still hold the conversation. This operation can be implemented by a REINVEINT request in the SIP protocol.

According to the method for seamlessly implementing transfer of a dual-party call into a conference according to the present embodiment, after establishing the conference room, the dual-party voice channel between the first terminal and the second terminal is not interrupted while establishing the first voice channel, the third voice channel and the second voice channel, i.e., the conversation between the first terminal and the second terminal proceeds, and the dual-party voice channel is released after starting the second voice channel. All the operations are background operations, and consume very short time, and the second terminal will not know that its own voice channel has been transferred to a second voice channel to the conference room, thus implementing seamless switch of the dual-party call into the conference.

Embodiment Two

The present embodiment is a further improvement on the method for seamlessly implementing transfer of a dual-party call into a conference of embodiment one.

In the present embodiment, after step 101 and before step 102, i.e., after receiving the conference room creating request transmitted by the first terminal and before creating a conference room according to the conference room creating request, the following step is further comprised:

performing authentication on the first terminal according to an identification of the first terminal in the conference room creating request, and when the authentication passes, triggering performance of an operation of creating a conference room according to the conference room creating request.

The identification of the first terminal can comprise a number of the first terminal and/or a user name of the first terminal etc. For example, when the first terminal is a cell phone, the number of the first terminal can be a name of an owner using the first terminal; however, as there is the case of namesake in the real life, the number of the first terminal is preferably a cell phone number. When the first terminal is a Personal Computer, PC, the authentication can be performed according to an Internet Protocol, IP, address of the first terminal.

In the present embodiment, an illegal terminal or a malicious terminal can be avoided from creating an illegal conference room by performing authentication on the identification of the first terminal and then performing subsequent operations when the authentication passes, which avoids excessive load for the conference system.

Embodiment Three

In the present embodiment, the above embodiments are further defined.

The present embodiment merely further defines step 103, and all other steps are coincident with those of the above embodiments, and will not be described herein further.

In step 103, establishing a first voice channel between the first terminal and the conference room comprises:

Step 1031, transmitting response information that the conference room is created successfully to the first terminal, wherein, the response information comprises a conference room identifier of the conference room.

Specifically, the first terminal can be notified that the conference room has been created by returning response information of 200 OK in the SIP protocol to the first terminal. After receiving the response information, the first terminal determines whether it is a conference room established for itself through the conference room identifier in the response information for example a head field of being from a calling party in the SIP protocol, and if so, listening in the background by default, and returning reply information.

Step 1032, receiving the reply information returned by the first terminal according to the response information, and establishing the first voice channel between the first terminal and the conference room according to the reply information.

According to the method for seamlessly implementing transfer of a dual-party call into a conference of the present embodiment, by returning the response information that the conference room is created successfully to the first terminal, then the first terminal returning the reply information according to the response information and then establishing the channel between the first terminal and the conference room, the first terminal can be enabled to be directly connected to the conference room created by itself by initiating a request, without entering into the conference room by other manual modes any more, i.e., the connection operation is completed in the background, and the first terminal needs not to be operated manually, which is very convenient.

Embodiment Four

The present embodiment four further defines the method for seamlessly implementing transfer of a dual-party call into a conference of the above embodiments.

The present embodiment merely further defines establishing and starting a first voice channel, a third voice channel and a second voice channel between the first terminal, a third terminal as well as the second terminal and the conference room respectively in step 103, and all other steps are coincident with those of the above embodiments, and will not be described herein further.

In the present embodiment, establishing and starting a first voice channel, a third voice channel and a second voice channel between the first terminal, a third terminal as well as the second terminal and the conference room respectively comprises:

establishing the first voice channel between the first terminal and the conference room, establishing the third voice channel between the third terminal and the conference room, and holding the third voice channel in an off state;

after releasing the dual-party voice channel, the third voice channel.

Specifically, establishment information can be transmitted to the first terminal after establishing the first voice channel and the third voice channel, and the first terminal transmits invite information for inviting the second terminal to participate in the conference room after receiving the establishment information, to make the second terminal participate in the conference room. The invite can be a SIP protocol based INVITE request, and after receiving the INVITE request, the second terminal can reply with an ACK request to notify the first terminal that the INVITE request has been received. Of course, if the second terminal does not want to participate in the request, it transmits a BYE request to substitute the ACK request. The first terminal can also require the third terminal to participate in the conference room based on the above request. In addition, the first terminal can also transmit a SIP protocol based REFER message to a Contrex AS, and after receiving the REFER message, the Contrex AS first transmits a SIP protocol based INVITE request to a Conference AS to create the second voice channel, the Conference AS returns SIP protocol based 200OK carrying a Session Description Protocol, SDP, of the conference room to the Contrex AS, and then the Contrex AS transmits the SDP of the conference room to the second terminal through a SIP protocol based REINVITE request, and after receiving the REINVEITE request, and the second terminal can transmit a SIP protocol based 200OK message to the Contrex AS after receiving the REINVITE request to participate in the conference room.

Optionally, after releasing the dual-party voice channel, the following steps are further comprised:

transmitting a releasing command to the first terminal, to indicate the first terminal to release a call leg between the first terminal and the second terminal according to the releasing command. Thus, the call lag which is not needed to be used any more can be released to mitigate the burden of the network. The call leg here is a Peer-to-Peer SIP relationship lasting for a time period between the first terminal and the second terminal.

According to the present embodiment, the third voice channel is not opened before releasing the dual-party channel, i.e., a user using the third terminal cannot listen words of a user using the first terminal, and the user using the first terminal also cannot listen words of the user using the third terminal, to avoid the influence caused by the user using the third terminal on the user using the first terminal.

Embodiment Five

Figure 2:
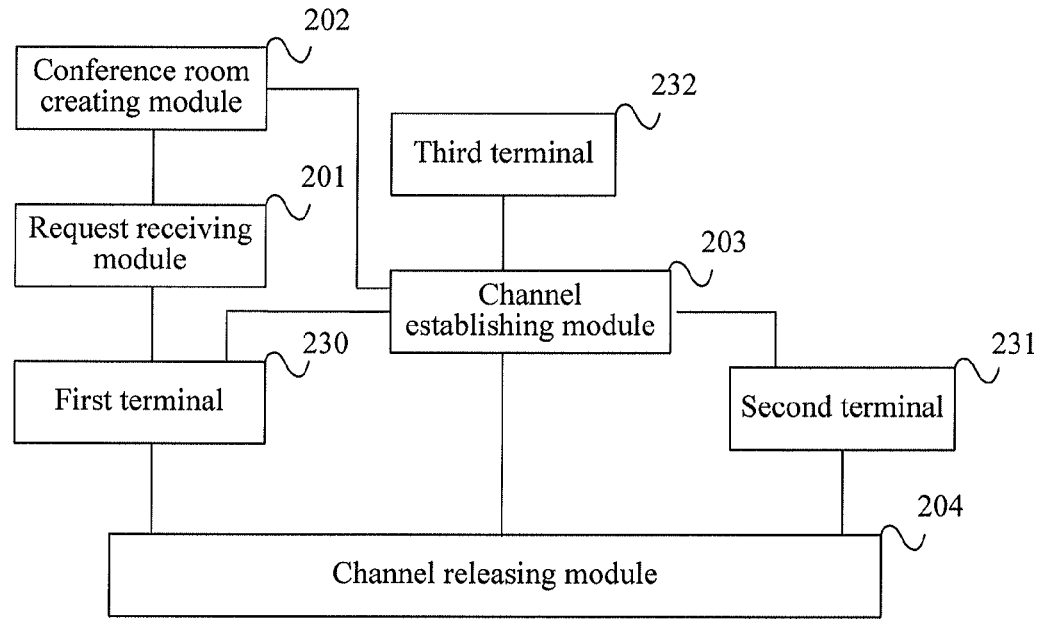
FIG. 2 is a structural diagram of an apparatus for seamlessly implementing transfer of a dual-party call into a conference according to another embodiment.

The present embodiment provides an apparatus for seamlessly implementing transfer of a dual-party call into a conference, which can be used to implement the method for seamlessly implementing transfer of a dual-party call into a conference in embodiment one. As shown in FIG. 2, a structural diagram of an apparatus for seamlessly implementing transfer of a dual-party call into a conference according to the present embodiment is illustrated.

The apparatus for seamlessly implementing transfer of a dual-party call into a conference comprises a request receiving module 201, a conference room creating module 202, a channel establishing module 203 and a channel releasing module 204.

The request receiving module 201 is connected to a first terminal 230, and is used to receive a conference room creating request transmitted by the first terminal 230; the conference room creating module 202 is connected to the request receiving module 201, and is used to create a conference room according to the conference room creating request; and the channel establishing module 203 is used to establish and start a first voice channel, a third voice channel and a second voice channel between the first terminal 230, a third terminal 232 as well as a second terminal 231 and the conference room respectively while holding a dual-party voice channel between the first terminal 230 and the second terminal 231 in an on state, i.e., after identifying that the conference room creating module 202 creates a conference room or after receiving information that the conference room has been created which is transmitted by the conference room creating module 202, establishing and starting the first voice channel, the second voice channel and the third voice channel respectively; and the channel releasing module 204 is used to release the dual-party voice channel after starting the first voice channel and the second voice channel at the same time.

According to the apparatus for seamlessly implementing transfer of a dual-party call into a conference of the present embodiment, after establishing the conference room, the dual-party voice channel between the first terminal 230 and the second terminal 231 is not interrupted while establishing the first voice channel, the third voice channel and the second voice channel, i.e., the conversation between the first terminal 230 and the second terminal 231 proceeds, and the dual-party voice channel is released after starting the second voice channel. All the operations are background operations, and consume very short time, and the second terminal 231 will not know that the voice channel of its own has been transferred to the second voice channel to the conference room, and as the first voice channel and the second voice channel are started at the same time, the continuity of the voice communication between the first terminal 230 and the second terminal 231 is ensured, thus implementing seamless switch of a dual-party call into a conference.

Embodiment Six

The present embodiment further defines the apparatus for seamlessly implementing transfer of a dual-party call into a conference of embodiment five.

Figure 3:
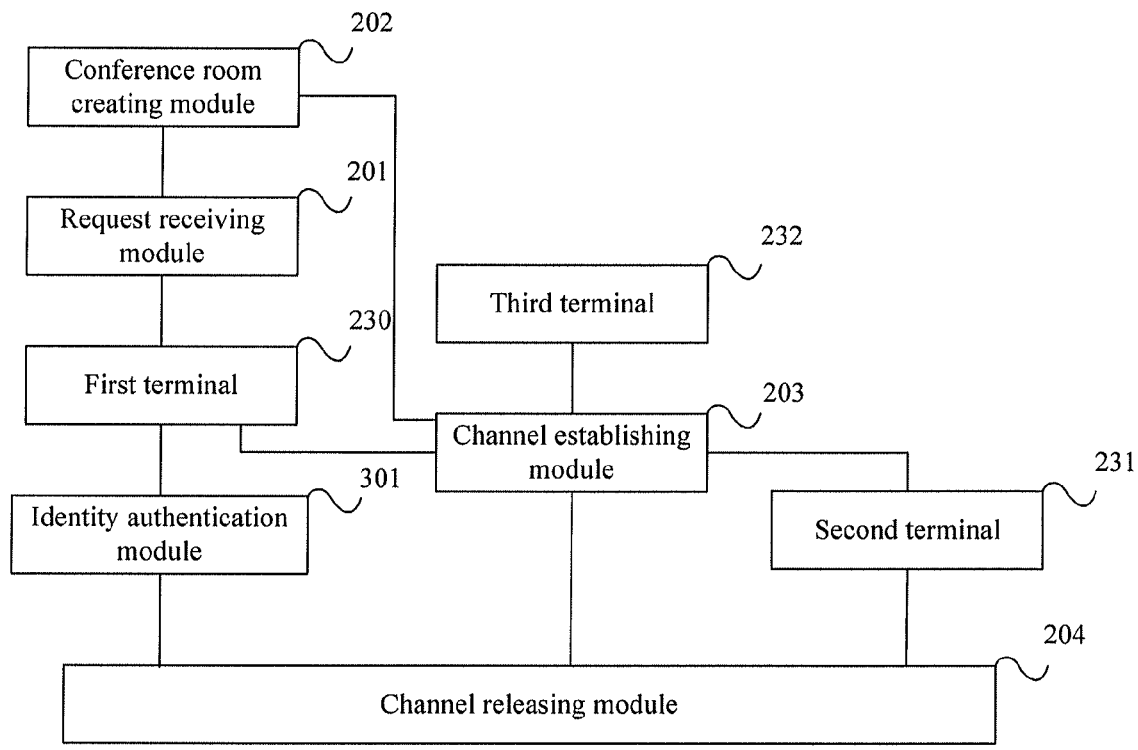
FIG. 3 is a structural diagram of an apparatus for seamlessly implementing transfer of a dual-party call into a conference according to another embodiment.

As shown in FIG. 3, a structural diagram of an apparatus for seamlessly implementing transfer of a dual-party call into a conference according to the present embodiment is illustrated.

The apparatus for seamlessly implementing transfer of a dual-party call into a conference in the present embodiment further comprises an identity authentication module 301, and all other modules are coincident with those of embodiment five, and will not be described herein further.

The identity authentication module 301 is used to perform authentication on the first terminal 230 according to an identification of the first terminal 230 in the conference room creating request, and when the authentication passes, triggering performance of an operation of creating a conference room according to the conference room creating request. The identification of the first terminal 230 can comprise a number of the first terminal 230 and/or a user name of the first terminal 230 etc.

In the present embodiment, an illegal terminal or a malicious terminal can be avoided from creating an illegal conference room by the identity authentication module 301 performing authentication on the identification of the first terminal 230 and then performing subsequent operations when the authentication passes, which avoids excessive load for the apparatus for seamlessly implementing transfer of a dual-party call into a conference.

Embodiment Seven

The present embodiment seven further defines the above embodiments.

Figure 4:
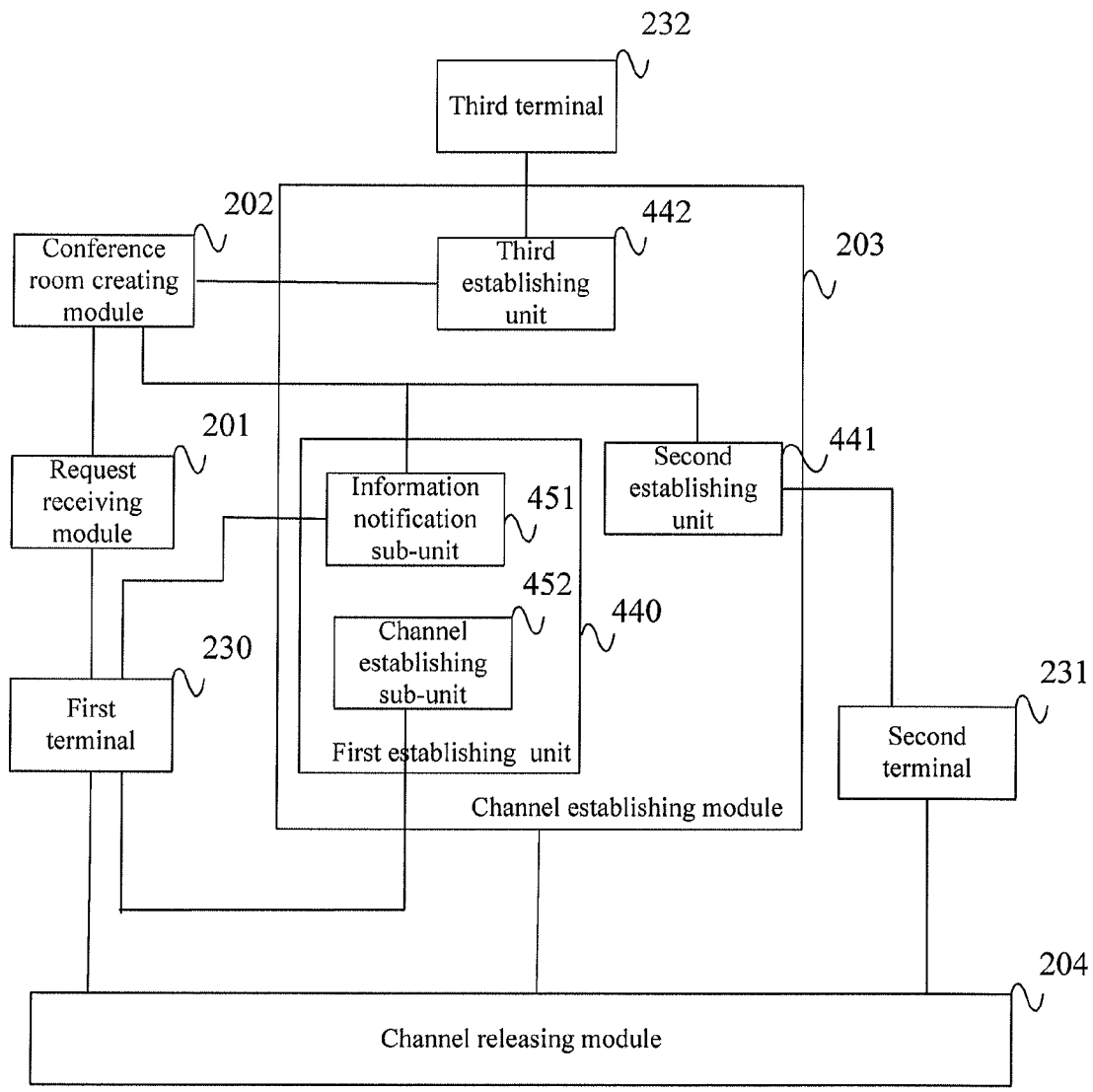
FIG. 4 is a structural diagram of an apparatus for seamlessly implementing transfer of a dual-party call into a conference according to another embodiment.

As shown in FIG. 4, a structural diagram of an apparatus for seamlessly implementing transfer of a dual-party call into a conference according to the present embodiment is illustrated. The present embodiment merely defines the channel establishing module 203, and all other structures are coincident with those of the above embodiments, and will not be described herein further.

The channel establishing module 203 in the present embodiment comprises: a first establishing unit 440, a second establishing unit 441 and a third establishing unit 442 for establishing and starting the first voice channel, the second voice channel and the third voice channel between the first terminal 230, the second terminal 231 and the third terminal 232 and the conference room respectively.

Wherein, the first establishing unit 440 comprises an information notification sub-unit 451 and a channel establishing sub-unit 452.

The information notification sub-unit 451 is used to transmit response information that the conference room is created successfully to the first terminal 230, wherein, the response information comprises a conference room identifier of the conference room; and the channel establishing sub-unit 452 is used to receive reply information returned by the first terminal 230 according to the response information, and create the first voice channel between the first terminal 230 and the conference room according to the reply information.

According to the apparatus for seamlessly implementing transfer of a dual-party call into a conference of the present embodiment, by returning the response information that the conference room is created successfully to the first terminal 230 and then the first terminal 230 returning reply information according to the response information, the first terminal 230 can be enabled to decide when to be connected to the conference room by itself, i.e., the first terminal 230 can set the time when the reply information is returned by itself, to determine when to make the third terminal 232 participate in the conversation between the first terminal 230 itself and the second terminal 231.

Embodiment Eight

The present embodiment further defines the apparatus for seamlessly implementing transfer of a dual-party call into a conference of the above embodiments.

Figure 5:
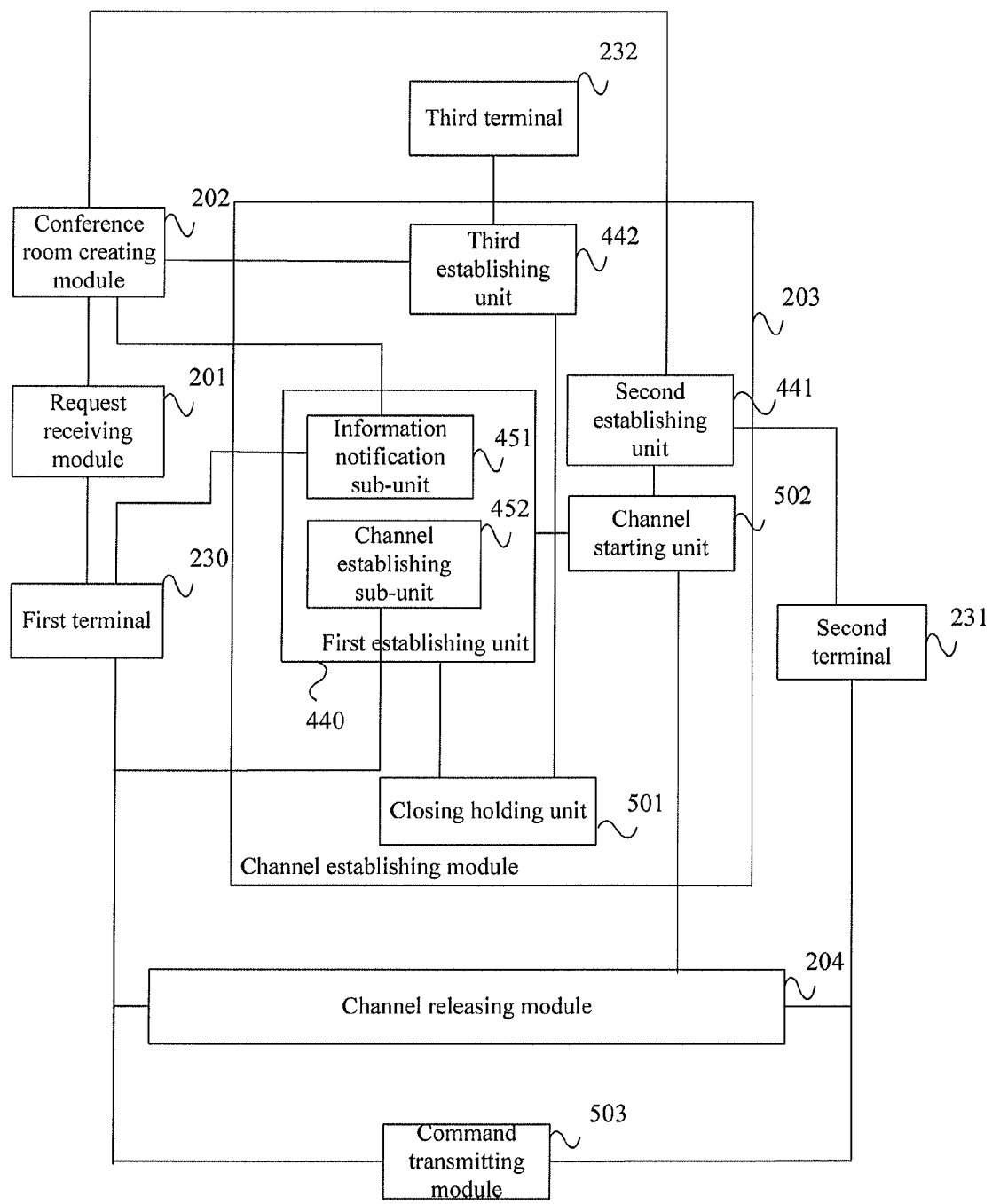
FIG. 5 is a structural diagram of an apparatus for seamlessly implementing transfer of a dual-party call into a conference according to another embodiment.

As shown in FIG. 5, a structural diagram of an apparatus for seamlessly implementing transfer of a dual-party call into a conference according to the present embodiment is illustrated. The present embodiment merely further defines the channel establishing module 203, and all other structures are coincident with those of the above embodiments, and will not be described herein further.

The channel establishing module 203 in the present embodiment comprises a closing holding unit 501 and a channel starting unit 502.

Wherein, the closing holding unit 501 is used to hold the third voice channel in an off state; and the channel starting unit 502 is used to start the third voice channel after releasing the dual-party voice channel.

Optionally, the apparatus for seamlessly implementing transfer of a dual-party call into a conference of the present embodiment further comprises a command transmitting module 503. The command transmitting module 503 is used to transmit a releasing command to the first terminal 230, to indicate the first terminal 230 to release a call leg between the first terminal 230 and the second terminal 231 according to the releasing command.

According to the present embodiment, the third voice channel is not opened before releasing the dual-party channel, i.e., a user using the third terminal 232 cannot listen words of a user using the first terminal 230, and the user using the first terminal 230 also cannot listen words of the user using the third terminal 232, to avoid the influence caused by the user using the third terminal 232 on the user using the first terminal 230.

A person ordinary in the art can understand that, all or a part of the steps which implement the above method embodiments can be implemented by the programs instructing the related hardware. The above programs can be stored in one computer-readable storage media, and the programs implement the steps comprising the above method embodiments when being implemented; and the above storage media comprise various media which can store program codes, such as ROM, RAM, disk or disc, etc.

Finally, it should be understood that the above embodiments are merely used to illustrate the technical solutions provided by the claims, and should not be considered limitations on the claims. In addition, it is understood that a person of ordinary skill in the art may modify the embodiments, or make equivalent substitutions to a part of the technical features therein. These amendments or substitutions will not make the essence of the corresponding technical solutions depart from the scope of the technical solutions of various embodiments of the claims.

What is claimed is:

1. A method for seamlessly transferring a dual-party call into a conference, comprising:
   receiving a conference room creation request from a first terminal;
   creating a conference room according to the conference room creation request; and
   while maintaining a dual-party voice channel between the first terminal and a second terminal in an on state, establishing and starting a first voice channel between the first terminal and the conference room, and a second voice channel between the second terminal and the conference room, and establishing a third voice channel between a third terminal and the conference room and maintaining the third voice channel in an off state;
   after starting the first voice channel and the second voice channel, simultaneously releasing the dual-party voice channel; and
   after releasing the dual-party voice channel, starting the third voice channel.

2. The method for seamlessly transferring of a dual-party call into a conference according to claim 1, wherein after receiving the conference room creation request from the first terminal and before creating the conference room according to the conference room creation request, the method further comprises:
   performing authentication on the first terminal according to an identification of the first terminal in the conference room creation request, and
   when the first terminal is authenticated, creating the conference room according to the conference room creating request.

3. The method for seamlessly transferring of a dual-party call into a conference according to claim 2, wherein performing authentication on the first terminal according to an identification of the first terminal in the conference room creation request comprises:
   when the first terminal is a cell phone, performing authentication on the first terminal according to a cell phone number of the first terminal in the conference room creation request; and
   when the first terminal is a personal computer, performing authentication on the first terminal according to an IP address of the first terminal in the conference room creation request.

4. The method for seamlessly transferring of a dual-party call into a conference according to claim 1, wherein establishing a first voice channel between the first terminal and the conference room comprises:
   transmitting, to the first terminal, response information that indicates that the conference room creation is successful, wherein the response information comprises a conference room identifier of the conference room; and
   receiving reply information returned by the first terminal based on the response information; and
   establishing the first voice channel between the first terminal and the conference room according to the reply information.

5. The method for seamlessly implementing transferring of a dual-party call into a conference according to claim 1, wherein after releasing the dual-party voice channel, the method further comprises:
   transmitting a release command to the first terminal that indicates to the first terminal to release a call leg between the first terminal and the second terminal according to the release command.

6. An apparatus for seamlessly transferring of a dual-party call into a conference, comprising:
   a request receiving module, configured to receive a conference room creation request from a first terminal;
   a conference room creation module, configured to create a conference room according to the conference room creation request;
   a channel establishing module, configured to establish and start a first voice channel between the first terminal and the conference room, and a second voice channel between the second terminal and the conference room, and to establish a third voice channel between the third terminal and the conference room while maintaining a dual-party voice channel between the first terminal and the second terminal in an on state, the channel establishing module comprising: a closing holding unit configured to hold the third voice channel in an off state; and a channel starting unit configured to start the third voice channel after releasing the dual-party voice channel; and
   a channel release module, configured to release the dual-party voice channel after simultaneously starting the first voice channel and the second voice channel.

7. The apparatus for seamlessly transferring of a dual-party call into a conference according to claim 6, further comprising:
   an identity authentication module, configured to perform authentication on the first terminal according to an identification of the first terminal in the conference room creation request, and when the authentication passes, triggering creation of the conference room according to the conference room creation request.

8. The apparatus for seamlessly transferring of a dual-party call into a conference according to claim 6, wherein the channel establishing module comprises:
   a first establishing unit, a second establishing unit, and a third establishing unit configured to establish and start a first voice channel between the first terminal and the conference room, a second voice channel between the second terminal and the conference room, and a third voice channel between the third terminal and the conference room, wherein, the first establishing unit comprises:
   an information notification sub-unit, configured to transmit, to the first terminal, response information that indicates that conference room creation is successful, wherein the response information comprises a conference room identifier of the conference room; and
   a channel establishing sub-unit, configured to receive reply information from the first terminal according to the response information, and establishing the first voice channel between the first terminal and the conference room according to the reply information.

9. The apparatus for seamlessly transferring of a dual-party call into a conference according to claim 6, further comprising:
- a command transmitting module, configured to transmit a release command to the first terminal to indicate to the first terminal to release a call leg between the first terminal and the second terminal according to the release command.

\* \* \* \* \*